United States Patent [19]

Hehl

[11] 4,266,694

[45] May 12, 1981

[54] CONVERTIBLE HOPPER MOUNTING FOR INJECTION MOLDING MACHINE

[76] Inventor: Karl Hehl, Arthur-Hehl-Strasse 32, 7298 Lossberg 1, Fed. Rep. of Germany

[21] Appl. No.: 64,252

[22] Filed: Aug. 6, 1979

[30] Foreign Application Priority Data

Aug. 4, 1978 [DE] Fed. Rep. of Germany ....... 2834203

[51] Int. Cl.³ .......................... B29B 5/02; B67C 9/00
[52] U.S. Cl. ................................. 222/167; 222/413; 285/181; 285/184
[58] Field of Search ................ 425/578, 580; 285/181, 285/184, 168; 141/98; 222/410, 413, 160, 167

[56] References Cited

U.S. PATENT DOCUMENTS

| 327,877 | 10/1885 | Hodges | 285/181 X |
|---|---|---|---|
| 749,417 | 1/1904 | Yeatman | 285/164 X |
| 1,390,976 | 9/1921 | Banbury | 222/410 |

FOREIGN PATENT DOCUMENTS

| 1150192 | 6/1963 | Fed. Rep. of Germany | 222/167 |
|---|---|---|---|
| 342490 | 8/1936 | Italy | 285/181 |

*Primary Examiner*—David A. Scherbel
*Attorney, Agent, or Firm*—Joseph A. Geiger

[57] ABSTRACT

A mounting structure for the granulate hopper of the injection unit of an injection molding machine which is convertible for use with a selectively horizontally or vertically oriented injection unit, the structure comprising two joined, rotatable tubular connectors each with an oblique end face, the lower connector being seated on an inclined face of the mounting hub which holds the plastification cylinder, and the upper connector carrying the hopper. The latter consists of a conical lower hopper portion and a cylindrical upper hopper portion which is inclined against the former so as to have one common straight side line which is vertical in both configurations. Conversion adjustment is accomplished through rotation of the lower connector and of the hopper by 180°.

13 Claims, 5 Drawing Figures

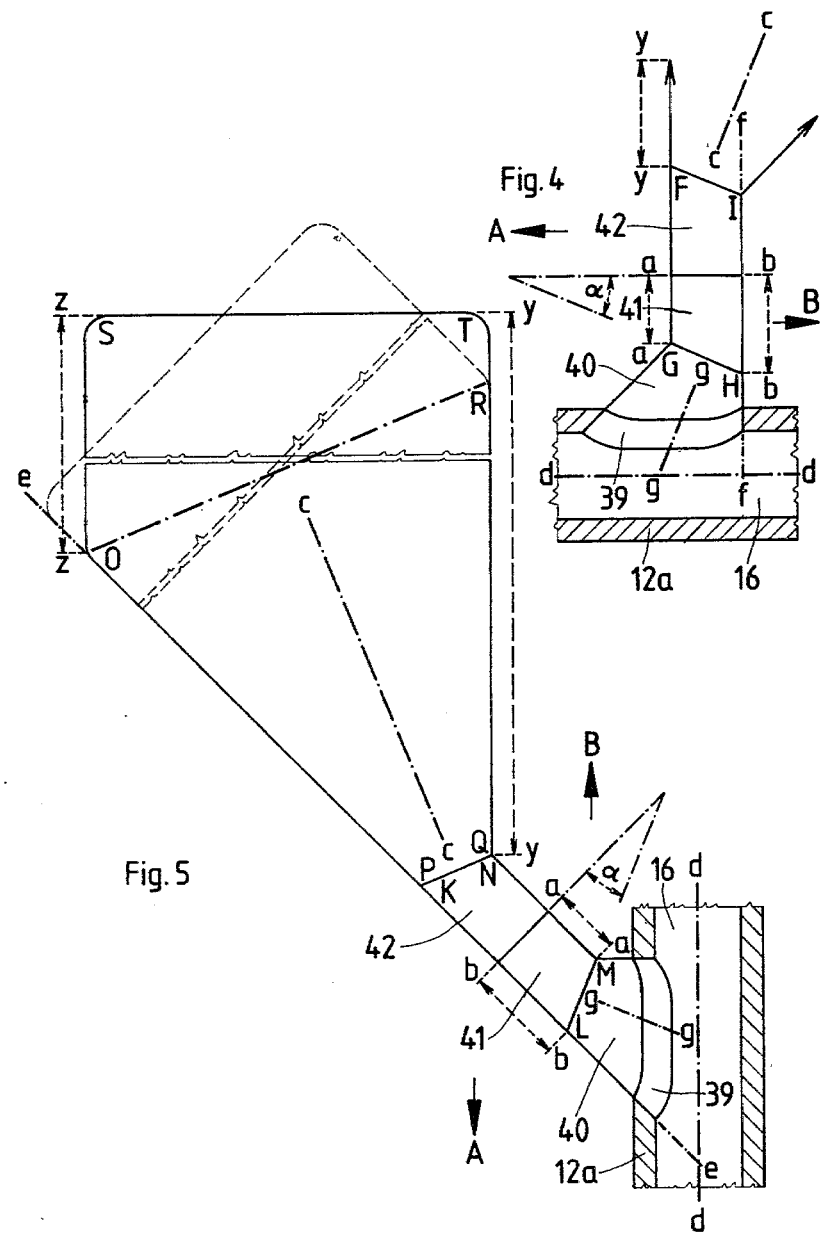

CONVERTIBLE HOPPER MOUNTING FOR INJECTION MOLDING MACHINE

BACKGROUND OF THE INVENTION

1. Field of the Invention

The present invention relates to raw material feeding devices for injection molding machine, and, more particularly, to a mounting structure for a granulate hopper on the plastification cylinder of an injection unit which is selectively convertible for use with a horizontally oriented injection unit or a vertically oriented injection unit.

2. Description of the Prior Art

A prior art structure, designed to accomplish convertibility of the hopper arrangement for horizontal and vertical orientation of the injection unit is disclosed in German Pat. No. 11 50 192. There, the axis of the flow channel which leads from the hopper base into the plastification cylinder is arranged at an acute angle with respect to the longitudinal axis of the injection unit. The hopper itself has a base portion which is axially aligned with the flow channel and is rotatable about the axis of that channel. However, the shape of the hopper is asymmetrical with respect to its axis of rotation, so that a major portion of its outline and interior cavity is located on one side of the axis of rotation. Because the axis of rotation of the hopper forms an angle of 45° with respect to the injection unit axis, and because the crown portion of the hopper is likewise inclined by 45° against the flow channel axis, it is possible to selectively orient the crown portion of the hopper in either a perpendicular or a parallel orientation with respect to the injection unit, through rotation of its base attachment by 180°.

A major shortcoming of this prior art solution is related to the fact that the flow channel which links the hopper base portion to the plastification cylinder is inclined at 45°. This inclination may lead to flow problems, especially for poorly flowable raw materials, such as pulverulent plastic raw materials, for example, for which a vertical flow channel may be desirable or even necessary.

SUMMARY OF THE INVENTION

Underlying the present invention is the primary objective of providing an improved convertible mounting structure for a granulate hopper on the injection unit of an injection molding machine which, while being rotatable for the selective orientation of the hopper crown portion in a parallel or perpendicular orientation to, respectively, a vertically or a horizontally oriented injection unit, allows gravity feed through the flow channel in both orientations and, additionally, provides in one of the two orientations a straight vertical flow shaft through which even poorly flowable raw material, such as incompletely dried or already preheated and therefore increasingly adherent plastic raw materials will flow into the plastification cylinder.

The present invention proposes to attain this objective by suggesting a mounting structure for the hopper of an injection unit which features, as a part of the flow channel configuration which links the hopper base to the cylinder mounting hub of the injection unit, a rotatable connector whose bore has the shape of a cylinder which is perpendicularly cut on its top side and obliquely cut on its bottom side, so as to include an acute angle α between the planes which define the cylinder extremities, whereby the connector is rotatable on the plane of the oblique cut, about the center of the elliptical cylinder extremity, between the two positions in which the shortest and longest side lines of the cylinder coincide with the vertical longitudinal center plane through the plastification cylinder, so that the axis of the connector is shifted by an angle twice the size of angle α. The invention further suggests that the supporting face on the mounting hub which is engaged by the inclined lower extremity of the connector be itself inclined rearwardly downwardly from the horizontal main plane of the injection unit by the same angle α, and that the connecting flow channel portion in the mounting hub which leads to the bore of the plastification cylinder have a downwardly diverging cross-sectional profile in the vertical center plane, so that either the front side line or the rear side line of the flow channel portion comes into alignment with the longest connector side line in the two connector positions.

The result of this geometry of the connector structure and adjoining mounting hub is a continuous flow channel through the connector and mounting hub which, for the horizontal position of the injection unit, presents a straight and continuous vertical rear side line and a kinked front side line which is vertical in the connector and forwardly downwardly inclined in the mounting hub. For the vertical position of the injection unit, it presents a continuous flow channel with a straight, but inclined front—i.e. lower—side line and a kinked rear—i.e. upper—side line which is inclined in the connector length portion and opens to a horizontal line in the mounting hub length portion.

In a preferred embodiment of the invention, the described connector serves as the lower one of two connectors, a second, upper connector being arranged between the lower connector and the hopper base. The flow channel portion formed by the upper connector has likewise the shape of a cylinder, being axially aligned with the cylindrical flow channel portion of the lower connector. Like the lower connector, the upper connector has a perpendicularly oriented extremity and an inclined extremity, forming an angle α therebetween. To the inclined upper extremity of the upper connector is attached the base of the hopper. The hopper itself has preferably a lower portion in the form of a regular cone with a perpendicularly oriented mounting face on its flange-shaped base, for attachment to the upper connector, and a cylindrical upper hopper portion which is angled off from the lower conical hopper portion by the same angle α. This angle is preferably 22.5°.

If, as in the preferred embodiment, the shape of the conical lower hopper portion is likewise based on the angle α for the inclination between the hopper side lines from the hopper center axis, then the flow outline for the horizontal position of the injection unit includes a continuous, straight and vertical front side line formed by the hopper and by the adjoining flow channel portions, and extending down through the lower connector, while, for the vertical position of the injection unit, the flow outline includes a lower side line which is continuous and straight, but inclined at 45°, extending all the way into the bore of the plastification cylinder.

The conversion of the mounting structure from one injection unit position to the other merely involves the rotation of the lower connector by 180° relative to the mounting hub and the upper connector, and a similar rotation of the hopper by 180° relative to the non-rotated, but now differently inclined, upper connector.

The upper, cylindrical portion of the hopper is then oriented vertically in both positions of the injection unit.

Because the proposed novel hopper mounting arrangement has relatively simple structural features, it can be produced at a comparatively low production cost, being at the same time very simple to assemble and to convert from one injection unit position to the other.

BRIEF DESCRIPTION OF THE DRAWINGS

Further special features and advantages of the invention will become apparent from the description following below, when taken together with the accompanying drawings which illustrate, by way of example, a preferred embodiment of the invention which is represented in the various figures as follows:

FIG. 4 illustrates the geometry of the flow channel connectors of the hopper mounting structure, as it applies to the horizontal position of the injection unit; and FIG. 5 similarly illustrates the geometry of the flow channel connectors and of the hopper mounting structure, including the outline of the hopper itself, as it applies to the vertically oriented injection unit.

DESCRIPTION OF THE PREFERRED EMBODIMENT

Figure 1:
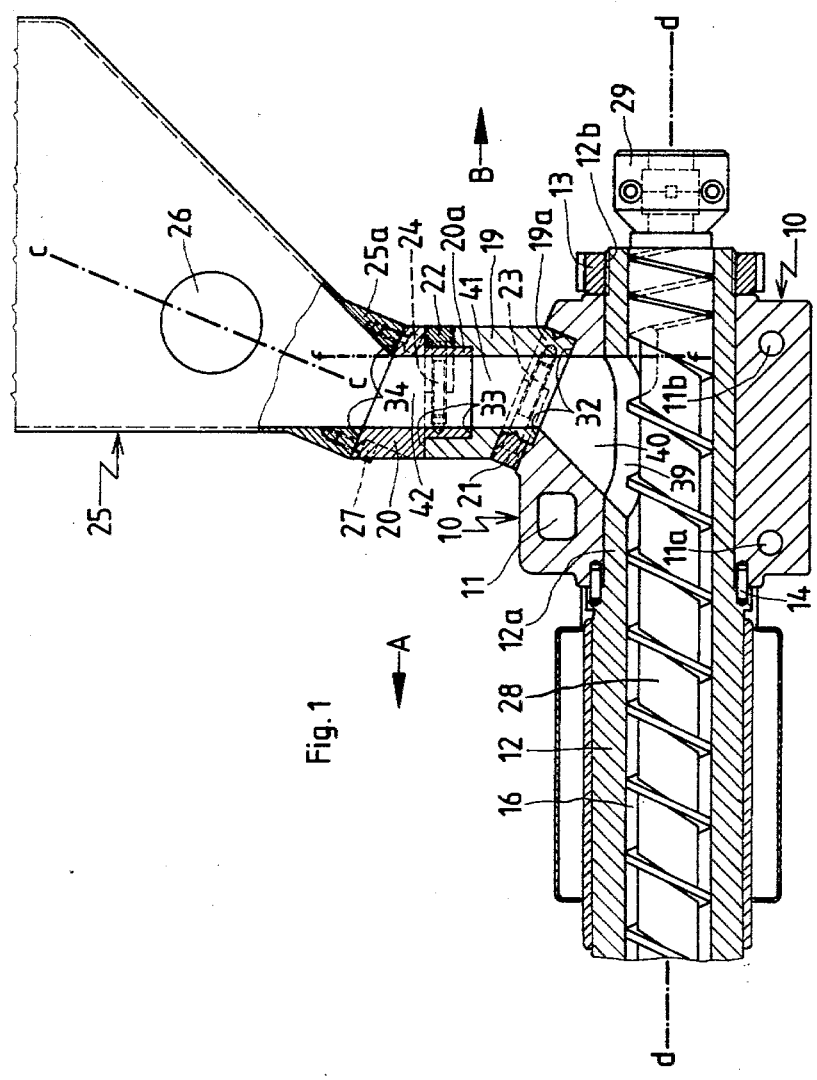
FIG. 1 shows a portion of an injection unit, as cross-sectioned along a vertical longitudinal center plane, the convertible hopper mounting structure of the invention being adjusted for the horizontal position of the injection unit.
Figure 2:
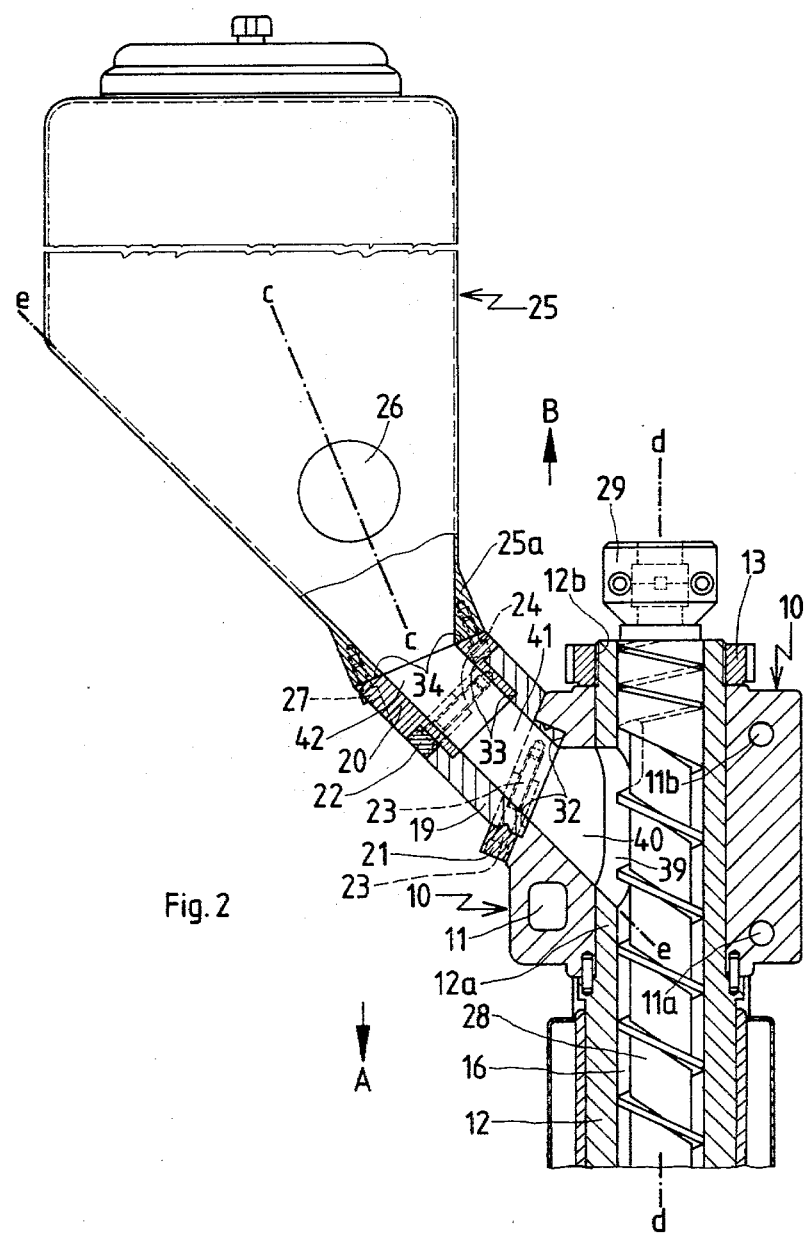
FIG. 2 shows the same parts of the injection unit and of the convertible hopper mounting structure which are shown in FIG. 1, but in a configuration which is adjusted for the vertical position of the injection unit.

Referring to FIGS. 1 and 2 of the drawing, there can be seen the longitudinally cross-sectioned carrier bridge 10 of an injection unit which, in cooperation with an injection molding machine, may be oriented horizontally, as shown in FIG. 1, or vertically, as shown in FIG. 2. In the first instance, the injection unit injects plastified raw material into the injection molding die from behind, through the die mounting plate and stationary die plate of the die closing unit of the machine. In the second instance, the injection unit is mounted on top of the die closing unit, injecting downwardly into the injection molding die, in alignment with its plane of partition.

The injection unit is typically carried by and guided on two parallel tie rods which reach through guide bores in the carrier bridge 10. The general configuration of the carrier bridge can be seen in FIG. 3 which also illustrates the manner in which the plastification cylinder 12 is mounted in the central mounting hub 10a of the carrier bridge 10. For this purpose, the plastification cylinder 12 has a neck portion 12a of reduced diameter with which it engages a matching axial bore in the mounting hub 10a. A threaded extremity 12b and a cooperating clamping nut 13 hold the plastification cylinder 12 in place, while its rotational position is determined by two positioning pins 14 (FIG. 1). The tie rods thus support and guide the carrier bridge and the plastification cylinder for axial movements, the rods themselves being fixedly mounted either on the cylinder mount of the die closing unit, or directly on the stationary die mounting plate of the die closing unit.

The bore 16 of the plastification cylinder 12 is occupied by a rotatable and axially movable plastification screw 28 whose rear extremity forms an enlarged coupling head 29 to which is connectable the drive shaft of a rotary drive (not shown). Through rotation of the plastification screw 28, the plastic raw material which has entered the plastification cylinder is advanced forwardly, under heat and pressure, thereby transforming it from its raw granular or pulverulent state into an injectable flowable mass. In order to prevent premature heating of the plastic raw material which is entering the mounting hub 10a through the flow channel portions 39 and 40, the latter is cooled by means of a coolant medium which occupies the coolant cavity 11, circulating through the coolant channels 11a and 11b.

Figure 3:
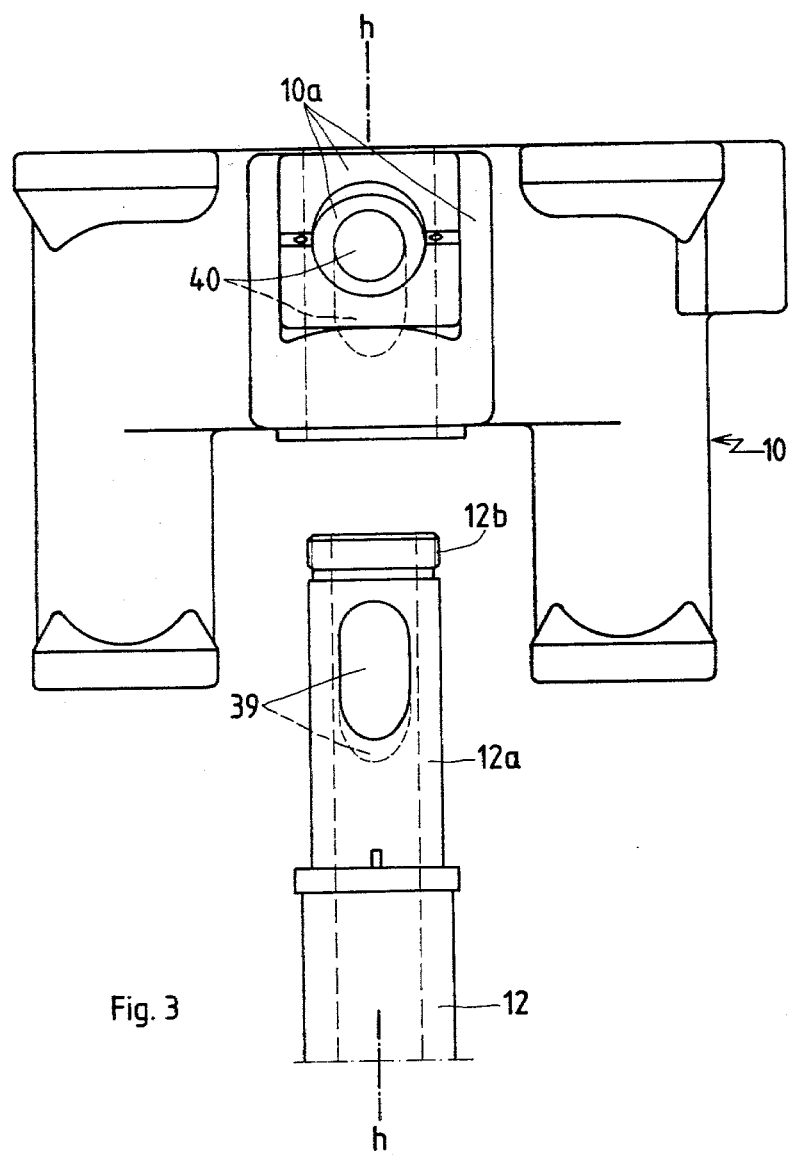
FIG. 3 shows portions of the injection unit, as seen in a plan view, the rear portion of the plastification cylinder being shown removed from its mounting bore.

FIG. 1 and FIG. 2 show identical component parts of the novel convertible hopper mounting structure, in the two assembly configurations which are suggested by the present invention. This hopper mounting structure consists essentially of a tubular lower connector 19 which engages a circular recess on the upper side of the mounting hub 10a, the recess forming an inclined annular support face 32 for the lower connector 19, around the flow channel portion 41 which is defined by the bore of the connector. As can be seen in FIG. 3, a portion of the wall surrounding the recess in the mounting hub 10a has been removed to make room for a clamping bracket 21 which secures the lower connector 19 to the hub 10a by means of a pair of clamping screws 23. The annular support face 32 of the mounting hub 10a and the cooperating lower end face of the lower connector 19 are inclined rearwardly downwardly with respect to the horizontal main plane of the injection unit, as defined by its tie rods and plastification cylinder. "Rearwardly", in this case, refers to direction B. The angle of inclination of the support face 33 is preferably 22.5°.

The center of the inclined annular support face 32 is also the center of the connector bore or flow channel portion 41 which, in the horizontal configuration of FIG. 1, is vertically aligned with a flow channel portion 40 in the mounting hub 10a. The latter takes the form of a downwardly diverging bore through the mounting hub 10a, continuing in a flow channel portion 39, in the form of a matching aperture in the wall of the plastification cylinder 12. In this position, the shortest and longest side lines of the flow channel portion 41 in the lower connector 19 are on the front and rear of the latter, coinciding with the vertical plane h-h (FIG. 3) which is also the center plane of the plastification cylinder and of the hopper mounting structure. The front side line of the adjoining flow channel portion 40 in the mounting hub 10a, while meeting the front side line of the flow channel portion 41 of connector 19 at the support face 32, is inclined by an angle of 45° with respect to the plastification cylinder axis d-d, thus forming a transition from the slightly elliptical channel contour at the top to an oblong contour, where the channel intersects the mounting bore for the plastification cylinder 12 (FIG. 3). The latter has an aperture into the cylinder bore 16 which forms a smoothly continuing flow channel portion 39 with aligned front and rear side lines.

Mounted on top of the lower connector 19 is a tubular upper connector 20 which is shaped to form a straight continuation of the lower connector 19, including an aligned cylindrical flow channel portion 42. The upper connector 20 is rotatable in relation to the lower connector 19, yet their bores remain always in alignment. For this purpose, the lower connector 19 has in its upper extremity an axial recess, defining annular support faces 33 for a matching centering collar 20a of the upper connector 20. The two connectors are secured to one another by means of a clamping bracket 22 and a pair of clamping screws 24 which are arranged in the upper end portion of the lower connector 19.

The upper connector 20 has its upper extremity cut obliquely with respect to its center axis, so as to form an inclined annular upper support face 34 for the base 25a of the granulate hopper 25. The angle of inclination of the hopper support face 34 from a radial plane to the connector center axis is again 22.5°, so that, in the configuration which is shown in FIG. 1, the top and bottom end faces of the combined connectors 19 and 20 are parallel to one another. It follows that, in the converted configuration of FIG. 2, the top and bottom end faces of the combined connectors 19 and 20 define between them an angle of 45°. The hopper 25 is attached to the upper connector 20 by means of several axially oriented clamping screws 27. The angular location of these screws around the connector 20 is such that the hopper 25 can be rotated by 180° relative to the upper connector 20.

The granulate hopper 25 has a conical lower hopper portion whose center axis c-c is perpendicular to the end face on the hopper base 25a by which it is attached to the face 34 of the upper connector 20. The taper of the conical lower hopper section is such that the outer side lines of the hopper are inclined from its center axis c-c by an angle of 22.5°. It follows that, in both flow channel configurations, one side line of the conical lower hopper portion is always exactly aligned with a side line of the combined flow channel portions 41 and 42 of the connectors 19 and 20. Continuing the hopper body upwardly is a cylindrical hopper portion which, again, is inclined with respect to the conical lower hopper portion by an angle of 22.5°. Accordingly, one side line of the upper hopper portion is aligned with one side line of the lower hopper portion, and the combined straight side line is oriented vertically in both mounting configurations.

The flow channel configurations for the two injection unit positions and the respective inclinations of the support faces and center axes of the constituent components of the novel hopper mounting structure are shown in a more abstract representation in FIGS. 4 and 5. There, it can be seen that, for the horizontal orientation of the plastification cylinder axis d-d, shown in FIG. 4, the combined flow channel portions 41 and 42 of the lower and upper connectors 19 and 20 form the outline of a parallelogram with the corner points F, G, H and I. For the vertical orientation of the plastification cylinder axis d-d, shown in FIG. 5, the same two connectors form aligned flow channel portions 41 and 42 in the outline of an isosceles trapezoid with the corner points K, L, M and N. FIGS. 4 and 5 also show that in both configurations a long side line of the parallelogram or trapezoid is aligned with the rear side line or the front side line, respectively, of the flow channel portions 39 and 40 of the plastification cylinder 12 and mounting hub 10a.

FIG. 5 shows how, for the vertical orientation of the injection axis d-d, the front—i.e. lower—side lines of the flow channel portions 39, 40, 41, and 42 are in alignment with one another and also with the corresponding side line of the conical lower hopper portion, so as to form a single continuous and straight "chute" side line e-e which is oriented at an inclination of 45° from the injection axis d-d. For the horizontally oriented injection axis d-d of FIG. 4, in contrast, the flow channel neck portion formed by the combined flow channel portions 41 and 42 is oriented vertically, having its front side line aligned with the continuous front side line y-y of the conical lower hopper portion and cylindrical upper hopper portion, while the rear side line of the vertical neck portion is aligned with the common rear side line of the downwardly adjoining flow channel portions 40 and 39, to form a continuous rear side line f-f from the corner point of the hopper base 25a to the bore 16 of the plastification cylinder 12. FIG. 4 also shows that the conical lower portion of the hopper and the downwardly widening flow channel portions 40 and 39 in the mounting hub 10a and plastification cylinder 12 have identical overall taper angles of 45° and that, accordingly, their respective center lines c-c and g-g are parallel and laterally offset from one another.

A particularly interesting feature of the novel flow channel configuration and hopper mounting structure is the fact that all the angles of inclination of the various connecting faces and all directional changes along the combined center line of the flow channel portions are one-sixteenth of a circle, or 22.5°. Conversion adjustment involves the half-turn rotation of the lower connector 19 and of the hopper 25. Thus, the angles of inclination produce reorientations of 45° in each case, so that, for the cylindrical upper hopper portion, a total reorientation angle of 90° is obtained, meaning that the upper hopper portion is vertical in both injection unit positions. In terms of general flow direction, it will be noted that, for the vertical injection position, the combined center line of the successive flow channel portions and hopper portions has a smoothly "curving" outline, consisting actually of four line sections, connected at three shallow kinks of 22.5° deviation. For the horizontal injection unit orientation, the same combined center line has a gently zigzagging outline in which the three kinks of 22.5° deviation alternate in direction.

FIG. 5 also shows the geometric configuration of the granulate hopper 25, indicating the junction between the conical lower hopper portion, defined by the outline corner points O, P, Q and R, with the cylindrical upper hopper portion, defined by the corner points O, R, T and S. The fact that the cone of the lower hopper portion has a side line angle of 22.5° and the cylindrical hopper portion is inclined to the cone axis by the same angle makes for one continuous common side line y-y for the two hopper portions. This side line y-y and the opposite hopper side line z-z are oriented vertically in both hopper mounting configurations.

It should be understood, however, that, if the upper portion of the hopper were to be made symmetrical with respect to the axis c-c of the conical lower hopper portion, or, if the upper hopper portion were to be made rotatable or otherwise adjustable with respect to the lower hopper portion, the rotation of the hopper base 25a relative to the upper connector 20 could be dispensed with. Even the rotation of the upper connector 20 with respect to the lower connector 19 would not be necessary in that case, provided a forwardly rather than rearwardly leaning hopper is acceptable for the horizontal injection unit position. In that particular case, the two connectors 19 and 20 could be integrated with the hopper base 25a, so that the conversion adjustments would be limited to a 180° rotation of this integrated assembly about the rotational axis g-g, at the support face 32 of the mounting hub 10a. FIG. 1 also shows that, in the horizontal injection unit position, the rotatable connection between the lower and upper connectors 19 and 20 allows for the rotation of the hopper about a vertical axis, so that the position of the hopper opening is adjustable along a horizontal circle.

It should be understood, of course, that the foregoing disclosure describes only a preferred embodiment of the invention and that it is intended to cover all changes and modifications of this example of the invention which fall within the scope of the appended claims.

I claim the following:

1. A mounting structure for the raw material hopper of an injection unit which plastifies and injects the raw material into the injection molding die of an injection molding machine, the mounting structure forming an adjustable flow channel connection between the hopper and the plastification cylinder of the injection unit, making it possible to obtain a substantially vertical orientation of the hopper in relation to a selectively horizontally or vertically oriented plastification cylinder, the hopper mounting structure comprising in combination:

a hopper base at the bottom end of the hopper;
   a mounting hub associated with a rearward portion of the plastification cylinder of the injection unit, the mounting hub having an opening in the form of a first flow channel portion which leads to the inside of the plastification cylinder; and
   a short tubular connecting sleeve attached on its two axial ends to the hopper base and to the mounting hub, respectively, so that the bore of the connecting sleeve forms a second flow channel portion which leads from the first flow channel portion to the bottom of the hopper; and wherein
   the connecting sleeve includes, associated with one of its attached axial ends, means for rotationally adjusting the hopper relative to the plastification cylinder about an adjustment axis which is inclined, by an acute angle of substantially no more than 45°, to the axis of the bore of the connecting sleeve, and which is also inclined, by an acute angle of substantially no more than 45°, rearwardly away from a radial plane through the plastification cylinder; and
   the rotational adjustment means has two favored adjustment positions, 180° apart, in which the two acute angles form a common center plane, whereby in one of the two adjustment positions, intended for a horizontally oriented plastification cylinder, the resultant general flow direction through the flow channel connection is substantially perpendicular to the axis of the plastification cylinder, and, in the other adjustment position, intended for a vertically oriented plastification cylinder, the resultant general flow direction through the flow channel connection is inclined outwardly, away from the axis of the plastification cylinder, by an acute angle of substantially no more than 45°.

2. A hopper mounting structure as defined in claim 1, wherein
   the means for rotationally adjusting the hopper is associated with that axial end of the connecting sleeve which is attached to the mounting hub of the injection unit;
   the rearward inclination of the adjustment axis is defined by a rearwardly inclined rotational seat for the connecting sleeve on the mounting hub, said seat surrounding the mounting hub opening; and
   the mounting hub opening, as seen in a longitudinal cross section through the plastification cylinder, has a front side line which is likewise inclined rearwardly away from a radial plane.

3. A hopper mounting structure as defined in claim 2, wherein
   the tubular connecting sleeve is an assembly of two short tubular connectors which are axially joined by a rotationally adjustable attachment, the first connector having a lower axial end with which it engages the rotational seat on the mounting hub, and the second connector having an upper axial end with which it is attached to the base of the hopper.

4. A hopper mounting structure as defined in claim 3, wherein
   the bores of the first and second connectors are axially aligned portions of a straight connecting sleeve bore;
   the rotationally adjustable attachment between the two connectors defines an axis of rotation which coincides with the axis of the connecting sleeve bore, the attachment being rotationally adjustable for two favored adjustment positions, likewise 180° apart;
   the hopper has a generally tapered lower hopper portion terminating in the hopper base and defining a taper axis; and
   the taper axis is inclined to the axis of the connecting sleeve bore by an acute angle of no more than 45°, the plane of said angle coinciding with said common center plane in both adjustment positions of the connector-to-connector attachment.

5. A hopper mounting structure as defined in claim 3 or claim 4, wherein
   the hopper base which is attached to the upper axial end of the second connector is rotationally adjustable with respect thereto, about a rotational axis which substantially coincides with the taper axis of the lower hopper portion; and
   said rotationally adjustable attachment has two favored adjustment positions 180° apart.

6. A hopper mounting structure as defined in claim 5, wherein
   the angle of inclination between the bore of the connecting sleeve and the axis of rotation defined by the seat of the first connector on the mounting hub and the angle of inclination between said bore and the rotational axis defined by the hopper base attachment to the second connector are identical in size, so that
   in one adjustment position of the attachment between the two connectors, intended for a horizontally oriented plastification cylinder, the inclination of the rotatable hopper base is parallel to the rearward inclination of the seat of the first connector giving the connector sleeve the outline of a parallelogram, and
   in the other adjustment position, intended for a vertically oriented plastification cylinder, the inclination of the rotatable hopper base is steeper than the inclination of the rearwardly inclined seat of the first connector, giving the connector sleeve the outline of an isosceles trapezoid.

7. A hopper mounting structure as defined in claim 6, wherein the angle of rearward inclination of the seat of the first connector on the mounting hub from the axis of the plastification cylinder, said two identical angles of inclination relating to the bore of the connector sleeve, and the angle between the taper axis of the hopper and its tapered side line are all substantially equal in size; and the angle of rearward inclination of the front side line of the mounting hub opening is twice as large as said identical angles, while the orientation of the rear side line of the hub opening is radial, so that in a first combination of adjustment positions, intended for a horizontally oriented plastification cylinder, the front side lines of the tapered hopper portion and of the connector sleeve bore are aligned and vertically radially oriented, and the rear side lines of the connector sleeve bore and of the mounting hub opening are parallel thereto; and in a second combination of adjustment positions, intended for a vertically oriented plastification cylinder, the front side lines of the tapered hopper portion and of the connector sleeve bore are aligned with the rearwardly inclined front side line of the mounting hub opening.

8. A hopper mounting structure as defined in claim 7, wherein the size of said identical angles is approximately 22.5°, and the angle of inclination of the front side line of the mounting hub opening is approximately 45°, so that, in the second combination of adjustment positions, the aligned front side lines are all inclined at approximately 45°.

9. A hopper mounting structure as defined in claim 7, wherein the size of said identical angles is approximately 30°, and the angle of inclination of the front side line of the mounting hub opening is approximately 60°, so that, in the second combination of adjustment positions, the aligned front side lines are all inclined at approximately 60°.

10. A convertible hopper arrangement for the injection unit of an injection molding machine which, for a selectively horizontally and vertically orientable plastification cylinder of the injection unit, makes it possible to orient the hopper substantially vertically in both plastification cylinder orientations, the hopper arrangement comprising:

a hopper having a cylindrical upper portion, a conically tapered lower portion, and a base at the lower extremity of the tapered hopper portion;

a mounting hub as part of the injection unit, the mounting hub surrounding a portion of the plastification cylinder;

a rotational connector seat on one side of the mounting hub defining a rotational axis which is inclined rearwardly away from a radial plane to the plastification cylinder by an angle $\alpha$ of 20° to 30°;

a mounting hub bore leading from the connector seat to the inside of the plastification cylinder, the bore, as seen in a longitudinal cross section through the plastification cylinder, having an inwardly diverging outline with a front side line inclined away from a radial plane by approximately twice the angle $\alpha$ and a substantially radially oriented rear side line;

a first short tubular connector which is clampable to the rotational connector seat on the mounting hub in two favored rotational adjustment positions, 180° apart, the first connector having a straight bore along a connector axis which is inclined to the rotational axis of the connector seat by said angle $\alpha$, in a plane which, in both adjustment positions, coincides with a longitudinal center plane through the plastification cylinder and its connector seat;

a second short tubular connector forming a link between the first connector and the base of the hopper with a straight bore which is aligned with and continues the bore of the first connector, the two connectors defining between them a rotationally adjustable attachment with two favored adjustment positions, 180° apart; and the upper connector and the hopper base define between them a rotationally adjustable clamping attachment with two favored adjustment positions, 180° apart, about the center axis of the conically tapered lower hopper portion, said center axis being inclined to the connector axis by said angle $\alpha$, in a plane which, in both adjustment positions, coincides with said longitudinal center plane.

11. A convertible hopper arrangement as defined in claim 10, wherein the taper angle of the cone defining the outline of the lower hopper portion is twice the angle $\alpha$; and the center axis of the cylindrical upper hopper portion is inclined to the center axis of the conically tapered lower hopper portion by said angle $\alpha$, so that, at one point on the hopper circumference, the upper and lower hopper portions have aligned side lines.

12. A convertible hopper arrangement as defined in claim 10 or claim 11, wherein the rotational connector seat on the mounting hub includes an axial recess and the first connector has a matching centering collar; and a circumferential portion of the recess-surrounding hub wall is removed and replaced by a clamping bracket and clamping screws which radially clamp the centering collar of the connector against the remaining portion of the recess-surrounding wall.

13. A convertible hopper arrangement as defined in claim 10 or claim 11, wherein the rotationally adjustable attachment between the two connector sleeves includes an axial recess in one of them and a matching centering collar in the other one; and a circumferential portion of the recess-surrounding connector wall is removed and replaced by a clamping bracket and clamping screws which radially clamp said centering collar of the one connector against the remaining portion of the recess-surrounding wall of the other connector.

* * * * *